(12) United States Patent
Morand et al.

(10) Patent No.: US 8,695,943 B2
(45) Date of Patent: Apr. 15, 2014

(54) WIRE INSTALLATION TOOL FOR HEATING WIRE SUPPORT MESHING

(75) Inventors: Michel Morand, Montreal (CA); Philippe Charron, Boucherville (CA)

(73) Assignee: Flextherm Inc., Longueuil, Quebec (CA)

( * ) Notice: Subject to any disclaimer, the term of this patent is extended or adjusted under 35 U.S.C. 154(b) by 463 days.

(21) Appl. No.: 12/915,827

(22) Filed: Oct. 29, 2010

(65) Prior Publication Data

US 2011/0101291 A1 May 5, 2011

Related U.S. Application Data

(60) Provisional application No. 61/255,896, filed on Oct. 29, 2009.

(51) Int. Cl.
*H02G 1/08* (2006.01)
*B63B 35/04* (2006.01)
*B65H 59/00* (2006.01)

(52) U.S. Cl.
USPC ............................ 254/134.3 R; 254/134.3 FT

(58) Field of Classification Search
USPC .................................. 254/134.3 R, 134.3 FT
See application file for complete search history.

(56) References Cited

U.S. PATENT DOCUMENTS

| 4,899,429 A * | 2/1990 | Londono ........................ 29/235 |
| 5,979,036 A * | 11/1999 | Socci et al. ..................... 29/451 |
| 2004/0107558 A1* | 6/2004 | Forsberg et al. ................ 29/450 |

* cited by examiner

*Primary Examiner* — Lee D Wilson
*Assistant Examiner* — Seahee Yoon
(74) *Attorney, Agent, or Firm* — Cook Alex Ltd.

(57) ABSTRACT

A tool for installing a heating wire in a floor substrate of the type having receiving means opened toward a surface thereof to receive a heating wire comprises a support with a handle portion to be manually handled by a user. A contact surface is related to the support, the contact surface adapted to contact the floor or floor substrate during displacement of the tool along the floor substrate. An interface is between the handle portion and a heating wire. The interface is adapted to contact the heating wire such that a given pressure applied on the handle portion by the user during the displacement of the tool along the floor substrate is converted by the interface into local engagement of the heating wire in at least one of the receiving means. A method for installing the heating wire using the tool is also provided.

8 Claims, 5 Drawing Sheets

WIRE INSTALLATION TOOL FOR HEATING WIRE SUPPORT MESHING

CROSS-REFERENCE TO RELATED APPLICATIONS

The present application claims the benefit of U.S. Patent Application Ser. No. 61/255,896, filed on Oct. 29, 2009, which is hereby incorporated herein by reference. The present application also relates to U.S. patent application Ser. No. 12/501,530, which is hereby incorporated herein by reference.

FIELD OF THE APPLICATION

The present application relates to a heating wire support meshing to install heating wires in heated floors, and more particularly to a tool for installing heating wire in support meshing.

BACKGROUND OF THE ART

The installation of heating wires in floors typically involves the use of installation strips or support meshing that hold the heating wire in a selected path until the floor is finished. For instance, a cementitious slurry is typically applied over the heating wire and support meshing or strips.

One of the issues related to the installation of heating wire in strips or support meshing is that it is labour-intensive. The installer must take the necessary precautions to avoid damaging the heating wire, and manipulate the wire with some level of dexterity to ensure the proper installation of the heating wire in the strips or support meshing. The installer may have to kneel down to perform the installation.

SUMMARY OF THE APPLICATION

It is therefore an aim of the present disclosure to provide a wire installation tool for radiant floors that addresses issues associated with the prior art.

Therefore, in accordance with the present application, there is provided a tool for installing a heating wire in a floor substrate of the type having receiving means opened toward a surface thereof to receive a heating wire, the tool comprising: a support with a handle portion to be manually handled by a user; a contact surface related to the support, the contact surface adapted to contact the floor or floor substrate during displacement of the tool along the floor substrate; and an interface between the handle portion and a heating wire, the interface being adapted to contact the heating wire such that a given pressure applied on the handle portion by the user during the displacement of the tool along the floor substrate is converted by the interface into local engagement of the heating wire in at least one of the receiving means.

Further in accordance with the present application, there is provided a method for installing a floor substrate of the type having receiving means opened toward a surface thereof to receive a heating wire comprising: simultaneously pressing a heating wire into engagement in individual ones of the receiving means of the floor substrate and moving along an installation path in the floor substrate by contact of the tool with the floor substrate.

DESCRIPTION OF THE PREFERRED EMBODIMENTS

Figure 1:
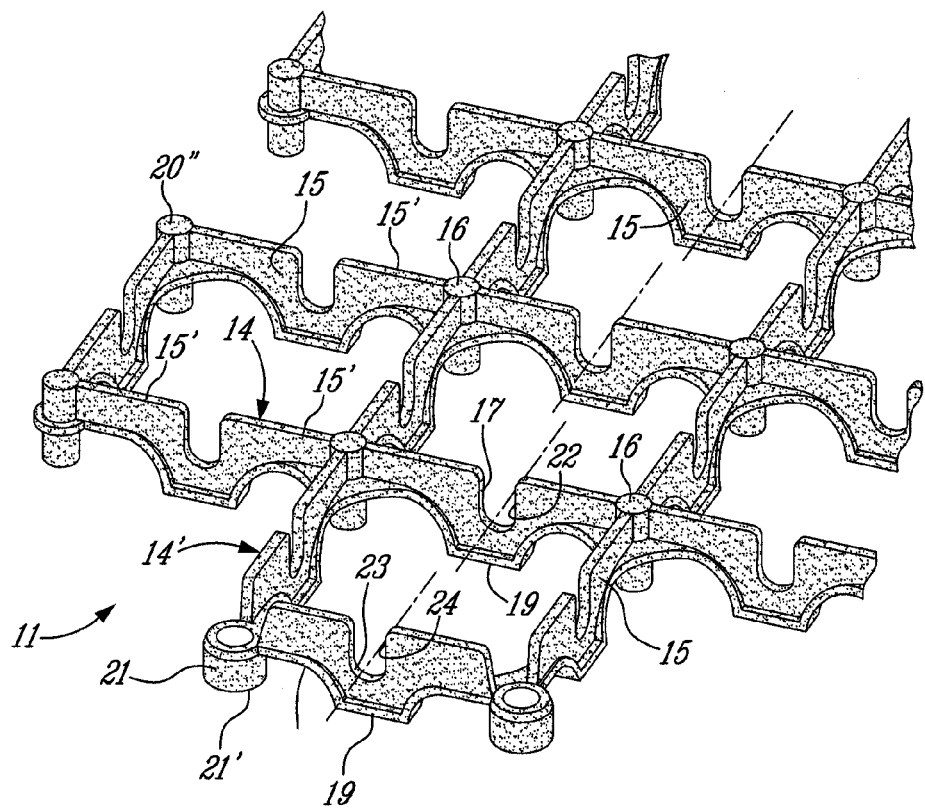
FIG. 1 is an enlarged fragmented view illustrating a mat section of heating wire support meshing.

Referring now to the drawings and more particularly to FIG. 1, there is shown a mat section 11 interconnectable with other similar mat sections 11 to form a heating wire support meshing 10 (FIGS. 5 and 6), as described in U.S. patent application Ser. No. 12/501,530, incorporated herein by reference. A heating wire 12 (FIGS. 5 and 6) is retained within the support meshing in an array to form a heating circuit.

Although fragmented in FIG. 1, the mat section 11 may be of substantially rectangular outline, of substantially square outline, or of any other suitable outline. The mat section 11 is formed by transversely spaced parallel rows of wire support bridge formations interconnected at their junctions, but this is not illustrated in FIGS. 1 and 2 for reasons of clarity.

Each of the mat sections 11 is formed by transversely spaced parallel rows, namely rows 14 and 14' of wire support bridge formations 15, with a free space between the rows 14/14'. The rows 14 are preferably spaced from one another the same distance the rows 14' are spaced from one another, this distance being called generically the "row spacing" for subsequent reference in the present application. Accordingly, the free Accordingly, the free space between rows 14/14' may be of square shape.

Figure 2:
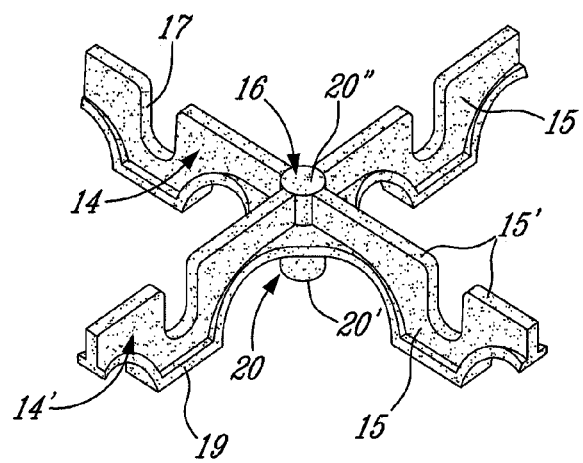
FIG. 2 is an enlarged view of FIG. 1 showing the construction of a post junction.

The wire support bridge formations 15 are inter-connected together at their crossings by a post junction 16 which is better illustrated in FIG. 2. The wire support bridge formations 15 have wire receiving means in the form of vertical wire-receiving slots 17 for receiving and guiding an electric heating wire 12, shown in FIGS. 5 and 6, along one or more desired paths. The receiving means may take any appropriate format (e.g., slot, channel, clip, etc).

The mat sections 11 are further provided with bottom support formations constituted by flat bottom wall portions 19 of the wire support bridge formations 15 and the bottom face 20' of the attachment posts 20 as well as the bottom face 21' of the cup formations 21, used for interconnection of adjacent mat sections 11 in forming a complete support meshing, as described in U.S. patent application Ser. No. 12/501,530. These bottom support formations 21 extend along a bottom planar surface of the mat sections 11.

Top support formations are constituted by the flat top wall 20" of the posts 20 and the flat top surfaces 15' of the bridge formations 15. As can be seen in FIG. 1, the bridge formations are provided with a flanged flat bottom surface 19 which lies in the bottom planar surface, to provide additional support on a sub-flooring. The top support formations (e.g., flat top wall 20") lie in a top planar surface of the mat section 11.

The vertical wire-receiving slots 17 in the bridge formations 15 have an open top end 22 to receive the wires therein and have a depth sufficient to retain the heating wire spaced below the top surface 15', herein intermediate the top and bottom planar surfaces. The wire-receiving slot 17 is also dimensioned for frictional engagement with the electric heating wire positioned therein. The slot also has a concavely curved concavely curved bottom edge 23 for smooth seating support of the heating wire. It also has substantially parallel side edges 24. Other mechanical wire-retaining features such as undercuts, retaining slot with protrusions, etc., are envisaged for retaining the wire in the slot 17.

It is pointed out that the mat sections 11, and consequently the entire support meshing 10, are constructed of a suitable plastic material. Preferably the mat sections are injection-molded. Any other type of meshing receiving heating wire may be used as well. The support meshing 10 of FIGS. 1 and 2 is provided for illustrative purposes, whereby alternatives to the support meshing 10 may be used with the wire installation tool described hereinafter.

Now that the mat sections 11 and support meshing 10 have been generally described, with more details available in U.S. patent application Ser. No. 12/501,530, a wire installation tool and use thereof are described.

Figure 3:
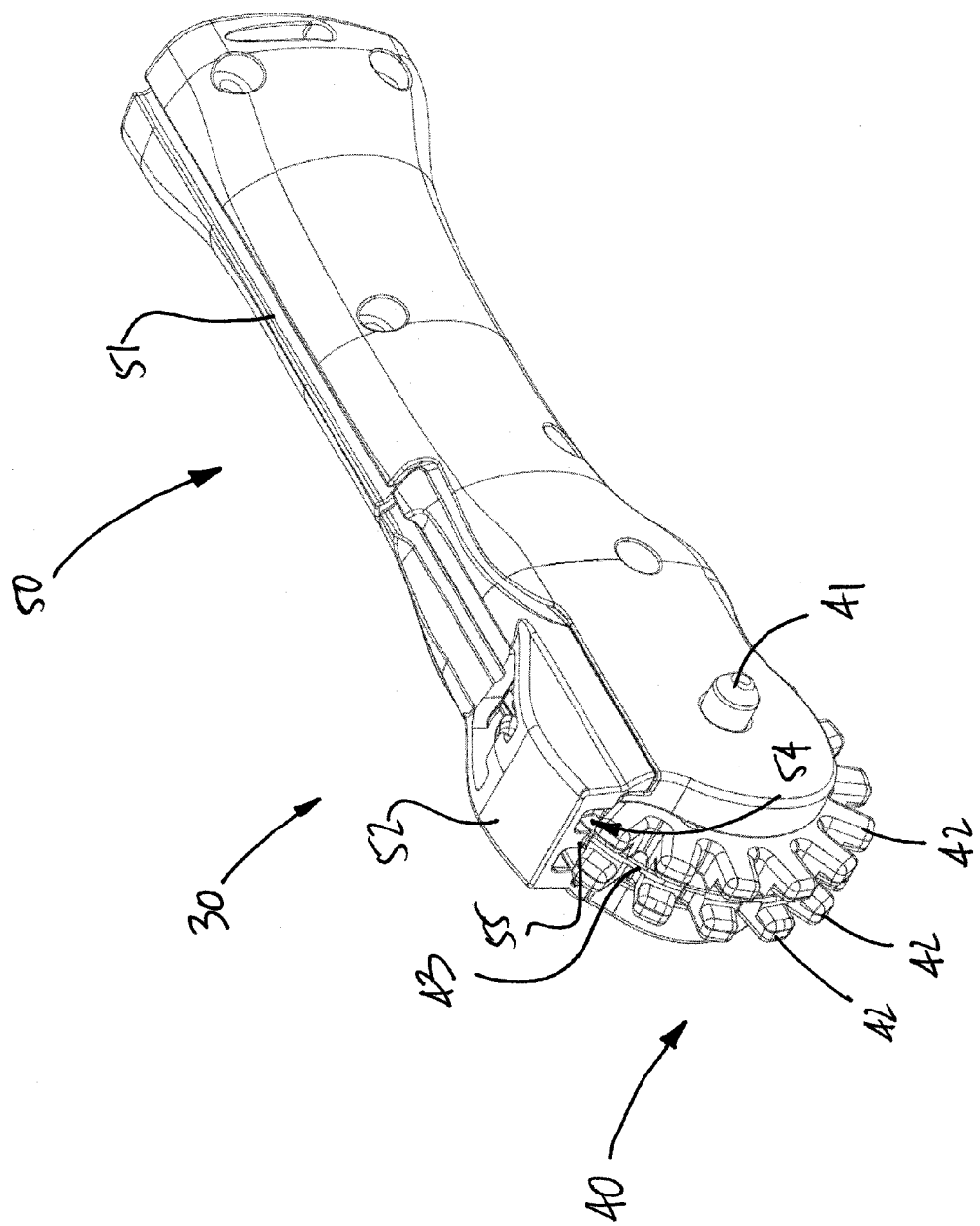
FIG. 3 is a perspective view of a wire installation tool constructed in accordance with an embodiment of the present disclosure.
Figure 4:
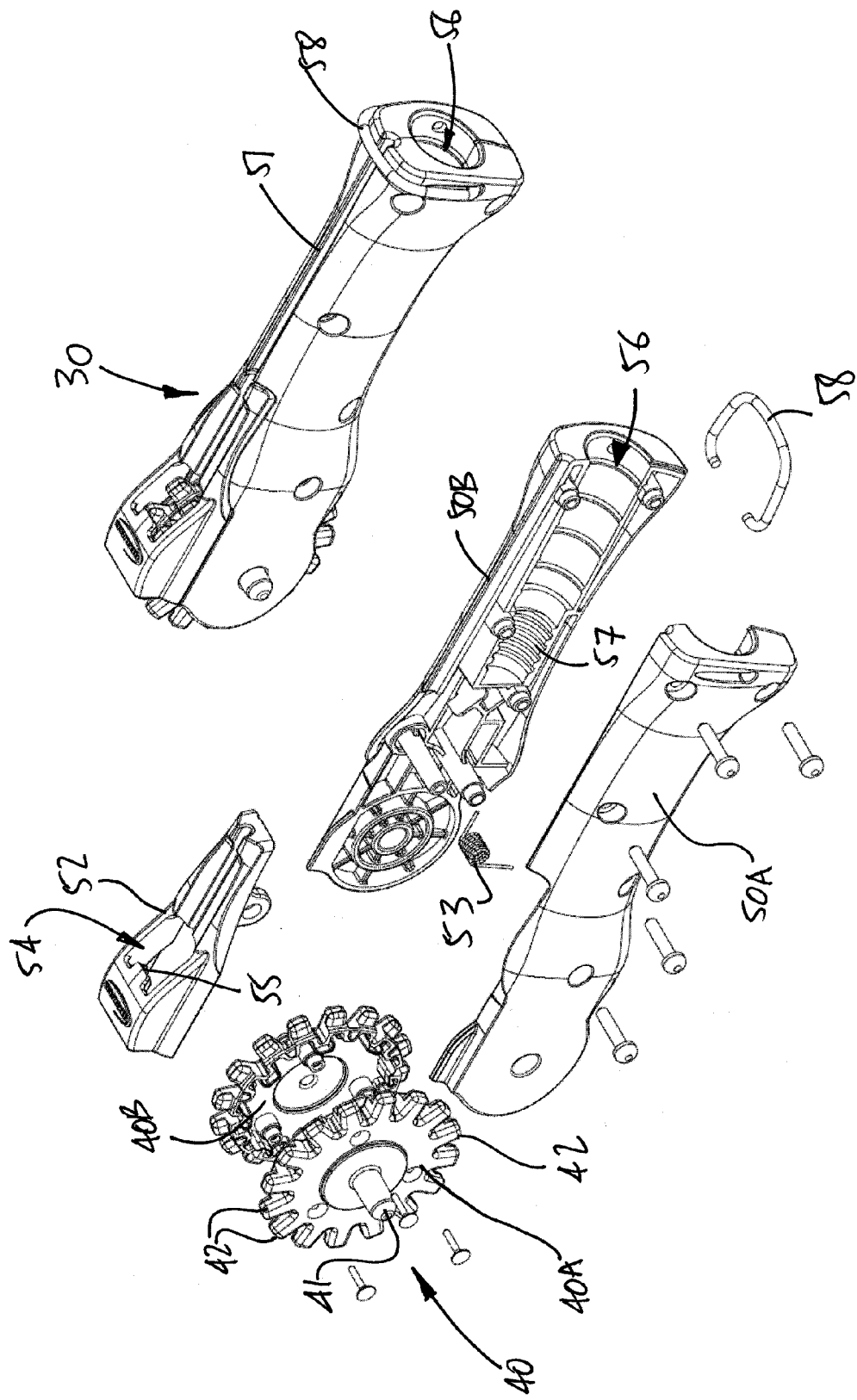
FIG. 4 is an assembly view and a perspective view of the wire installation tool of FIG. 3.

Referring concurrently to FIGS. 3 and 4, a wire installation tool is generally shown at 30. The tool 30 is used to install the heating wire 12 in the support meshing 10 (FIGS. 5 and 6), or in any equivalent floor substrate used to receive a heating wire 12.

The tool 30 has an interface that is used to press the heating wire 12 into engagement in the floor substrate, i.e., the support meshing 10, and a contact surface by the tool 30 contacts the floor substrate or the floor. In the illustrated embodiment, the interface and the contact surface are both part of an installing wheel 40 idled in the support 50. A portion of the installing wheel 40 is therefore the interface between the heating wire 12 and the support 50 of the installation tool 30, as it converts a pressure on the support 50 of the installation tool 30 to an insertion of the heating wire 12 in the floor substrate. Another portion of the installing wheel 40 is also the contact surface of the tool 30 with the floor substrate, as tool 30 with the floor substrate, as it moves relative to the floor substrate by contacting same.

The support 50 is handled by an installer person, either directly or through a pole A.

The installing wheel 40 has an axle 41 by which it is rotatably supported in the support 50, such that it is free to rotate. The axle 41 extends laterally from both sides of the support 50. Accordingly, as will be described hereinafter, the axle 41 forms a visual indicator from a plan view, as it indicates to an installer the position of the center of the wheel 40, and thus the point of engagement between the heating wire 12 and the floor substrate.

Two rows of radial fingers 42 project radially from the body of the wheel 40, with the rows of radial fingers 42 being separated by a groove 43. In the assembly of FIG. 4, the wheel 40 is shown having two separate wheel halves 40A and 40B, assembled to form the wheel of FIG. 3. The assembly of FIG. 4 constitutes one assembly possibility over many other assemblies considered to form the wheel 40, such as integrally molding the wheel 40. The two rows of radial fingers 42 and the spacing between adjacent fingers 42 of the same row represent the contact surface of the tool 30 with the floor/floor substrate (e.g., meshing 10), as will be described hereinafter.

The groove 43 is sized to receive the heating wire without, however, holding the wire captive between the radial fingers 42. The heating wire is blocked from lateral movement (i.e., along an axial direction of the wheel 40) by the presence of the radial fingers 42. The surface of the groove 43 is the interface between the tool 30 and the heating wire 12.

Figure 5:
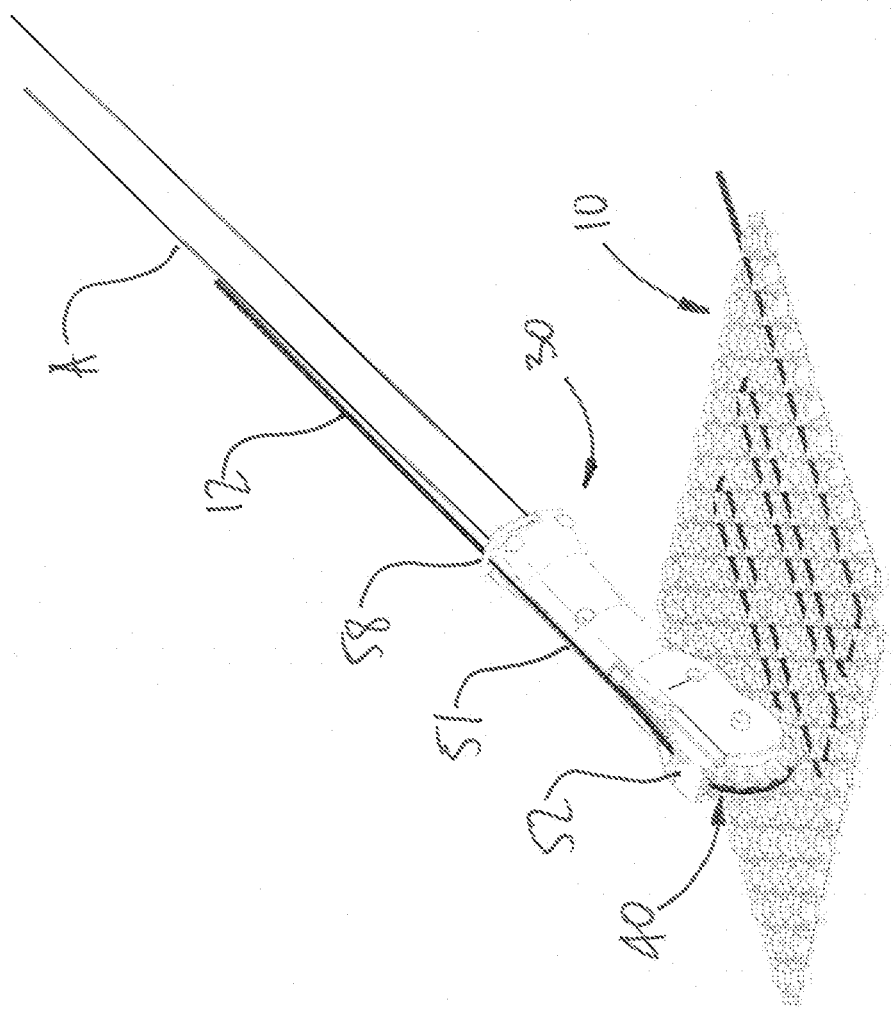
FIG. 5 is a perspective view of the wire installation tool as used to install heating wire in the heating wire support meshing of FIG. 1.
Figure 6:
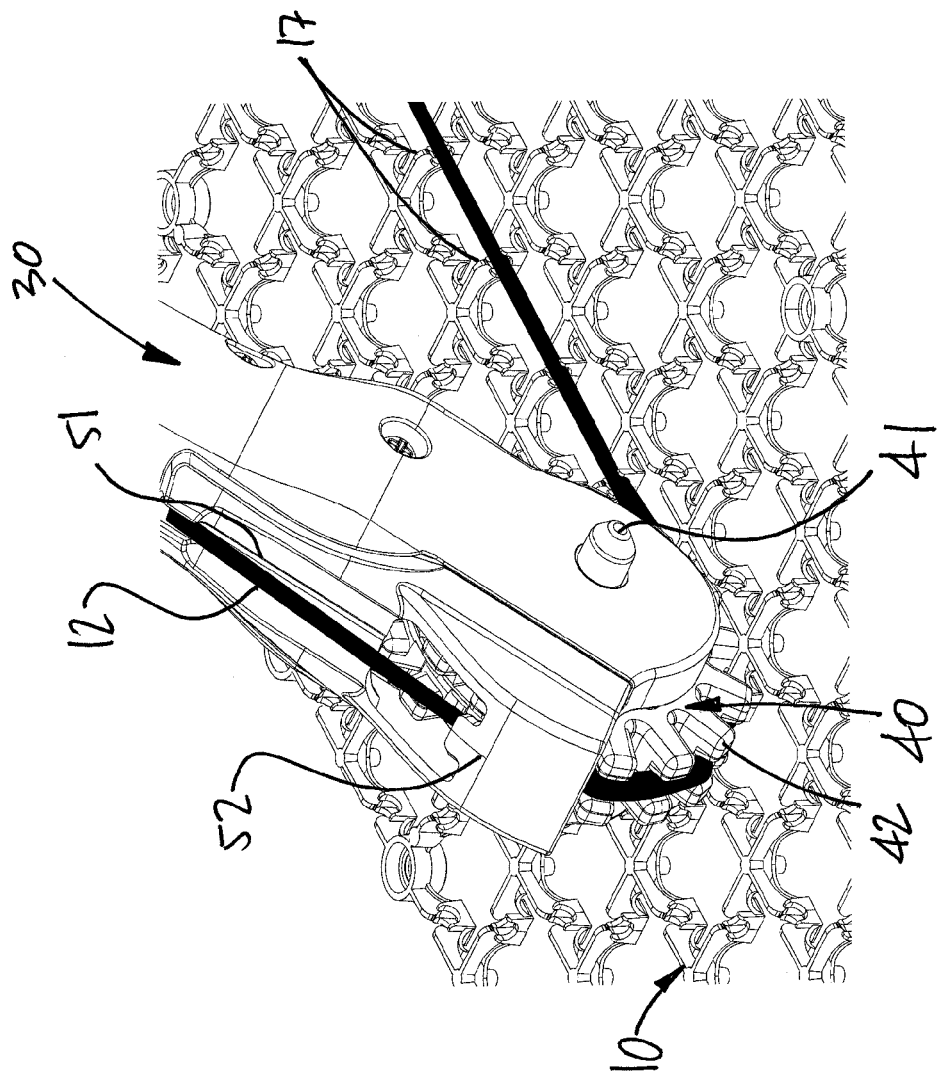
FIG. 6 is an enlarged view of the wire installation tool being used as in FIG. 5.

The radial fingers 42 of a same row are spaced apart such that the spacing between the fingers 42 (and thus between the gaps defined by adjacent fingers 42) is generally equal to the row spacing between rows 14/14' of the support meshing. In the illustrated embodiment, two of the fingers 42 fit simultaneously in the space between rows 14/14' as shown in FIGS. 5 and 6, but it may be that only a single one of fingers 42 fits in the space between rows 14/14'. Alternatively, more than two fingers 42 may fit into the space between the rows 14/14'. Therefore, by this equivalence relation between the row spacing and the finger spacing, the fingers 42 penetrate the space between the rows 14/14' when the wheel 40 is rolled onto the top surface of the support meshing, as shown in FIGS. 5 and 6, for the guided displacement of the wheel 40 along the floor substrate.

By way of example, the row spacing may be of 1.0 inch. Therefore, the rows 14 are parallel to one another and spaced apart by 1.0 inch, as are the rows 14'. In the illustrated embodiment, center lines of the gaps at opposed ends of a pair of two radial fingers 42 are spaced apart by about 1.0 inch. The row spacing may be more or less than 1.0 inch.

More importantly, the support meshing 10 and the wheel 40 have complementary shapes, such that the wheel 40 is guided when rolling in a straight path along the support meshing 10 by the complementary engagement.

Any complementary shape may be used. For instance, the contact surface of the tool may be flat pads sliding on top of the floor substrate. As an another example with guided displacement, the tool has blades penetrating the slots 17 in the front and/or in the back of the interface, or on the sides of the interface.

Referring concurrently to FIGS. 3 and 4, the support 50 is shown rotatably supporting the installing wheel 40. The support 50 has an elongated body with a longitudinal groove 51. The longitudinal groove 51 has a section shaped to receive the heating wire, such that the heating wire may slide along the along the groove 51. In the assembly of FIG. 4, the support 50 is shown having two separate support halves 50A and 50B, among other components, assembled to form the support 50 of FIG. 3. The assembly of FIG. 4 constitutes one assembly possibility over many other assemblies considered to form the support 50.

A wire guide clamp 52 is positioned at an end of the groove 51 and is adjacent to the installing wheel 40. The wire guide clamp 52 is pivotably mounted to the body of the support 50, and is biased against the support 50 by spring 53 (FIG. 4). The free end of the wire guide clamp 52 is arch-shaped, and therefore defines an opening 54 surrounding the installing wheel 40. A pusher 55 is centrally positioned in the opening 54, and the pusher 55 is aligned with the groove 43 in the wheel 40.

Therefore, referring to FIG. 5, when a length of the heating wire 12 is on the tool 30, the heating wire 12 threads through the opening 54, and is kept in the groove 43 of the wheel 40 by the pusher 55, and may also thread through a wire guide ring as described below. As heating wire 12 is dispensed by the tool 30, the biasing action of the wire guide clamp 52 allows freedom of movement of the heating wire 12 with respect to the tool 30, while ensuring that the heating wire 12 remains in between the rows of radial fingers 42 of the wheel 40, and thus in the groove 43.

Referring to FIG. 4, an opposed end of the support 50 has an open end 56, so as to accommodate the end of a pole A (e.g., stick, rod, or the like). According to one embodiment, tapping 57 is provided in the open end 56, for the screwing engagement of a threaded end of the pole A. Other connection configurations are considered as well. A wire guide ring 58 is also provided at the end of the support 50. The wire guide ring 58 ensures that the heating wire 12 stays in the longitudinal groove 51. The wire guide ring 58 is one embodiment among many embodiment among many others considered. For instance, a closed channel may alternatively be provided along the longitudinal groove 51.

It is pointed out that the heating wire 12 typically may have a cold lead at an end, which cold lead is larger in diameter than a remainder of the heating wire 12. Accordingly, the movement of the wire guide clamp 52 and of the wire guide ring 58 allow the cold lead to be threaded through the tool 30.

Now that the wire installation tool 30 has been described, the installation of the heating wire 12 in the floor substrate, such as the support meshing 10, is set forth. The installation of the heating wire 12 is preferably performed after the floor substrate has been installed on the floor. As an alternative, the heating wire 12 may be installed on the floor substrate, with the floor substrate being installed in the floor subsequently.

In an embodiment, the heating wire 12 is installed on the wire installation tool 30, with a free end of the heating wire 12 being threaded through the wire guide ring 58, along the longitudinal groove 51, through the opening 54 of the clamp 52, around a portion of the wheel 40 within the groove 43 thereof.

In another embodiment, the heating wire 12 may be positioned directly on the floor substrate, above the slots of the floor substrate that will receive the heating wire 12 (e.g., slots 17).

The free end of the heating wire 12, for example extending out of the tool 30, is inserted into a few vertical wire-receiving slots 17 (FIG. 1), for instance manually.

The installation tool is then displaced along the floor substrate, along a path in which it is desired to set the heating wire 12. In an embodiment, the wheel 40 rolls along a selected path in the support meshing 10. In FIG. 5, a multidirectional path is illustrated. Accordingly, as described above, the fingers 42 fit into the space between the rows 14/14', whereby the tool 30 is guided along a straight path by this complementary engagement. As a result, the heating wire 12 is pressed by the groove 43 of the wheel 40 (i.e., the interface) into the vertical wire-receiving slots 17, as the tool 30/wheel 40 moves/rolls along the support meshing 10. The heating wire 12 is caught and held captive in the vertical wire-receiving slots 17.

As heating wire 12 is dispensed in the manner illustrated in FIGS. 5 and 6, more heating wire 12 is fed from a spool. The wire guide ring 58 ensures that the heating wire 12 enters through the longitudinal groove 51, and remains aligned with the wheel 40 in the tool 30.

If the selected path of installation of the heating wire 12 requires a turn, the dimension of the radial fingers 42 set forth above allows a user to orient the tool 30 in another direction, with the heating wire 12 following the new direction by clamping into the appropriate vertical wire-receiving slots 17. The installer may use the extensions of the axle 41 as a visual indicator when changing direction in installing the heating cable 12.

The tool 30 allows the installer to move in a backward direction if the heating wire 12 is not properly installed in the slots 17. Accordingly, a second or subsequent pass may allow the user to get the proper installation.

Although one specific embodiment of the tool 30 and support meshing 10 is described, other configurations may work as well. The complementary engagement between the support meshing 10 and the tool 30 allows the wheel 40 of the tool 30 to be guided when moving along a path on the support meshing 10, while simultaneously installing the heating wire 12 in the support meshing 10. In the embodiments featuring guided displacement and complementary engagement, an installer may install the heating wire 12 in the support meshing 10 from a standing position if desired, with the use of the pole A. For instance, rolling movement of the tool 30 may not be required, for instance by having the tool 30 glide over the support meshing 10.

The invention claimed is:

1. A tool for installing a heating wire in a floor substrate of the type having receiving means opened toward a surface thereof to receive a heating wire and installed on a floor, the tool comprising:
   a support with a handle portion to be manually handled by a user;
   a contact surface related to the support, the contact surface adapted to contact the floor or floor substrate during displacement of the tool along the floor substrate, the contact surface being part of a wheel rotatably supported by the support, and having at least one row of spaced-apart fingers projecting radially from the wheel for penetrating engagement of the fingers in the receiving means of the floor substrate when rolling along the floor substrate along wire installation paths; and
   an interface between the handle portion and a heating wire, the interface being adapted to contact the heating wire such that a given pressure applied on the handle portion by the user during the displacement of the tool along the floor substrate is converted by the interface into local engagement of the heating wire in at least one of the receiving means.

2. The tool according to claim 1, wherein the support has an axle for rotatably supporting the wheel, with the axle projecting laterally from a remainder of the support along an axis of the wheel to define a visual indicator for the user to indicate a region of contact between the interface and the heating wire.

3. The tool according to claim 1, wherein the peripheral surface of the wheel comprises a pair of the rows of spaced-apart fingers projecting radially from the wheel, for engagement in spacings in the floor substrate.

4. The tool according to claim 3, wherein a groove is provided on the wheel between the rows of spaced-apart fingers, with a surface of the groove being said interface.

5. The tool according to claim 1, wherein the support has a longitudinal groove tangentially aligned with respect to the wheel to feed heating wire to the wheel for subsequent installation of the heating wire in the receiving means of the floor substrate by the interface.

6. The tool according to claim 5, further comprising a wire guide on the support between the longitudinal groove and the wheel, the wire guide adapted to guide the heating wire into the wheel.

7. The tool according to claim 6, further comprising biasing means biasing the wire guide toward a remainder of the support to further guide the heating wire into the wheel.

8. The tool according to claim 1, wherein the handle portion is a pole connected to a remainder of the support.

* * * * *